March 11, 1947. D. G. ROOS 2,417,214
REAR AXLE DRIVE ASSEMBLY
Filed Feb. 25, 1944 4 Sheets-Sheet 1

INVENTOR.
Delmar G. Roos
BY Harry O. Emsberger
ATTORNEY

March 11, 1947. D. G. ROOS 2,417,214
REAR AXLE DRIVE ASSEMBLY
Filed Feb. 25, 1944 4 Sheets-Sheet 2

INVENTOR.
Delmar G. Roos
BY Harry O. Ernsberger
ATTORNEY

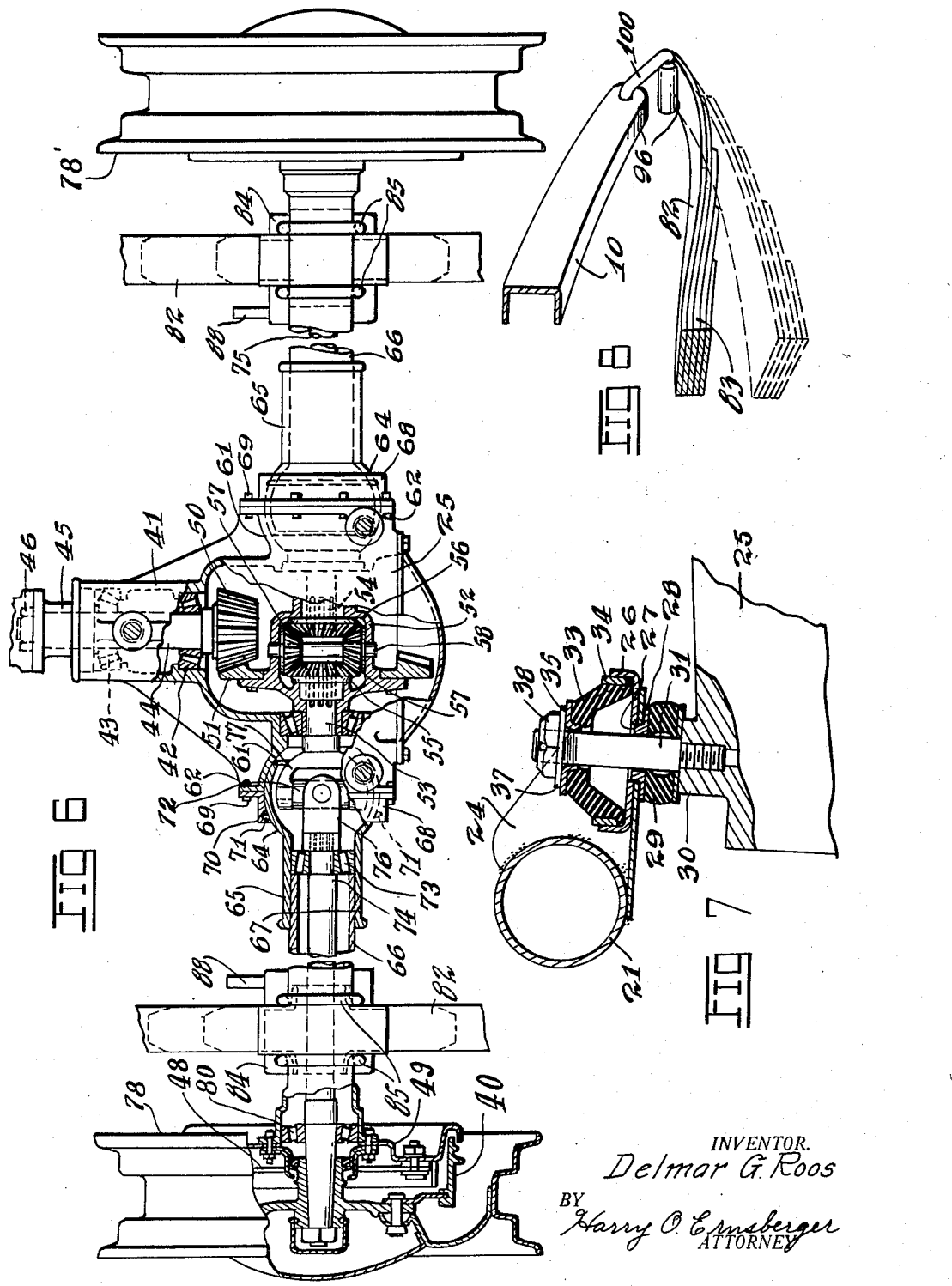

INVENTOR.
Delmar G Roos

Patented Mar. 11, 1947

2,417,214

UNITED STATES PATENT OFFICE 2,417,214

REAR AXLE DRIVE ASSEMBLY

Delmar G. Roos, Toledo, Ohio, assignor to Willys-Overland Motors, Inc., Toledo, Ohio, a corporation of Delaware Application February 25, 1944, Serial No. 523,823

4 Claims. (Cl. 180—73)

The present invention relates to running gear of automotive vehicles and more especially to an arrangement in which the driving wheels of the vehicle are independently suspended from the frame.

Numerous attempts have been made to develop a satisfactory means for mounting the driving wheels of vehicles so as to obtain numerous advantages including the benefits of decreased unsprung weight, but many disadvantages have heretofore been encountered which have precluded the extensive manufacture of vehicles of this character.

One of the objects of this invention is the provision of an arrangement of independently sprung drive wheels for a vehicle which is simple in construction and which may be produced in quantities at a reasonable cost.

The invention embraces a springing system or arrangement for vehicle wheels wherein the spring rate, i. e. the relationship between the load and spring deflection, instead of being constant as in springs heretofore used, is rendered variable thus greatly improving the riding qualities of the vehicle.

The invention is inclusive of a springing arrangement whereby a wheel is independently sprung upon the frame in such a manner that the supporting spring system is subjected to compound stresses during substantially vertical movements of the vehicle wheel, thereby attaining a variable spring rate without the use of extraneous devices.

A further object of the invention resides in an arrangement of securing a swinging or hinged axle to a spring system whereby relative movements of the spring with respect to the vehicle frame initiate compound stresses in the spring system which substantially eliminate the natural or normal periodicity of vibration, so that actions and reactions of the spring system in operation, are quickly and inherently damped out.

Another object is the provision of a spring suspension system and axle arrangement wherein the wear upon the tires is more uniformly distributed over the peripheral surface thereof thus prolonging the useful life of the tires.

Another object of the invention is the provision of an axle and spring suspension arrangement wherein unsprung weight is reduced to a minimum.

Still another object of the invention is the provision of a vehicle drive wheel independently sprung in such a manner that unsprung weight is reduced to a minimum through the utilization of a swinging axle obtaining an improved ride for the vehicle and whereby the body construction and center of gravity are substantially lowered, thus enhancing the roadability of the vehicle and its ability to negotiate curves at high speeds.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 6 is a detail sectional veiw taken substantially on the line 6—6 of Figure 3;

Figure 7 is an enlarged fragmentary detail sectional view taken substantially on the line 7—7 of Figure 1;

Figure 8 is a diagrammatic view illustrating the action of a spring for different axle positions;

Figure 1:
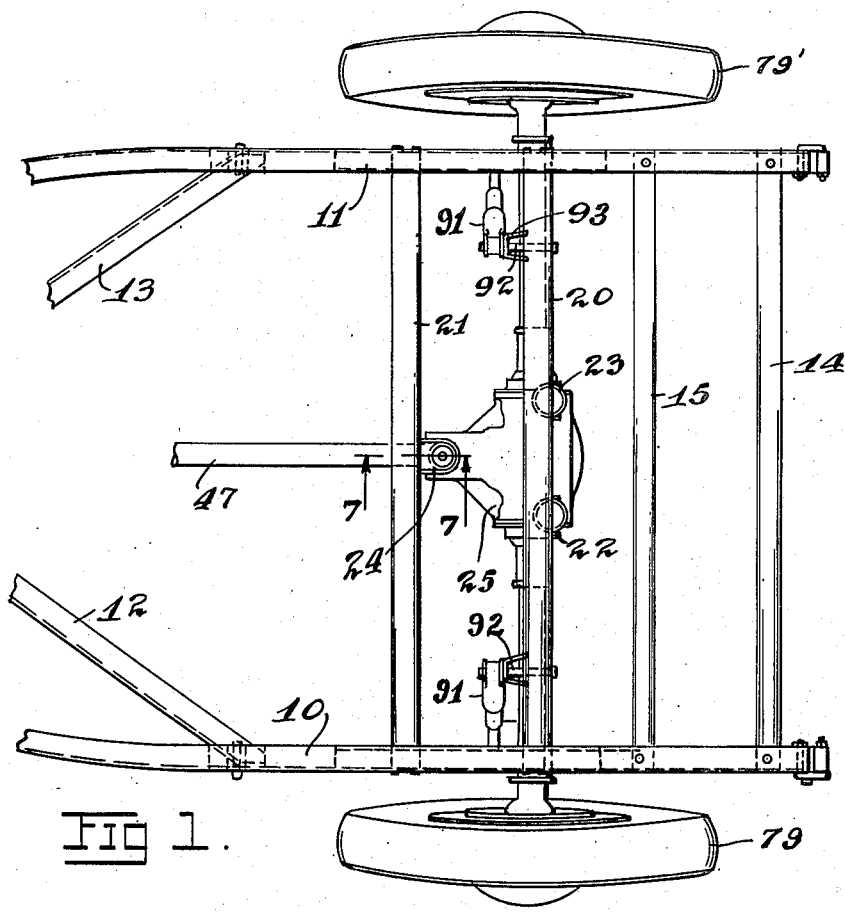
Figure 1 is a top plan view showing a portion of a vehicle frame, spring suspension and axle assembly of my invention.
Figure 2:
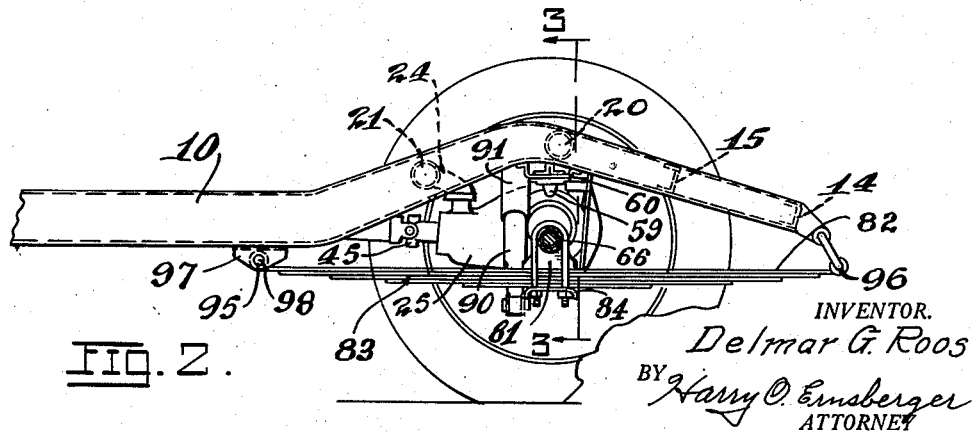
Figure 2 is a side elevational view of the structure shown in Figure 1, one of the vehicle wheels being removed.

Referring to the drawings in detail, the vehicle frame construction illustrated is inclusive of longitudinally extending side rails or members 10 and 11 which are secured together by diagonally extending channel-shaped members 12 and 13 joined together at their point of conversion (not shown), this arrangement lending stiffness and rigidity to the frame construction. The rear portions of frame members 10 and 11 are joined together by means of channel shaped transversely extending members 14 and 15 which are riveted and welded to the side frame members as shown in Figure 1. The frame side rails 10 and 11 are also joined together by means of tubular members 20 and 21 having their extremities welded or otherwise rigidly secured to the side rails. At the point of juncture of members 20 and 21 with the side rails, the latter are reinforced by channel shaped sections 19 welded to the side rails and the tubular members. Welded to the tube 20 is a pair of spaced similarly shaped brackets 22 and 23, and welded or otherwise fixedly secured to the tube 21 is a bracket 24 of the same configuration as brackets 22 and 23. The brackets 22, 23 and 24 serve as supporting means for a housing 25 enclosing drive gear and differential mechanism.

In the arrangement of my invention, the differential housing 25 is supported by the vehicle frame in a relatively fixed position with respect to the axles, but is arranged for slight resilient movement with respect to the frame. To this end a resilient mounting is preferably employed of a character tending to eliminate the transference of gear and other mechanical noises from the differential housing 25 to the frame. Welded or otherwise secured to each of the brackets 22, 23 and 24 are metallic cup-like members 26, each bracket and member 26 having aligned openings to accommodate a tenon 27 formed on a metal plate 28 bonded to a cushion block 29 formed of caoutchouc, synthetic rubber or the like. The housing 25 is formed with three bosses 30 each being bored and threaded to receive the threaded extremity of a stud member 31, the studs being in alignment with openings in the blocks 29 and openings in cup-like members 26. Each of the members 26 is arranged to accommodate an annularly shaped cushion or support 33 fabricated of caoutchouc or other resilient material, each cushion being reinforced by means of metal members 34 and 35. The stud members project upwardly through the cushions, each stud being arranged to receive a washer 37 and a nut 38 to secure the parts in assembled relationship. By the means above described, the differential housing 25 is resiliently mounted for slight relative movement with respect to the frame and is thus supported at three spaced points. By this arrangement of mounting the differential and drive gear housing, the torque reaction or driving thrust is resiliently absorbed by or transmitted to the frame of the vehicle.

The housing 25 is formed with an integral elongated portion 41 within which are arranged bearings 42 and 43 revolubly supporting a short shaft 44. One end of the shaft 44 is splined to receive a member 45 secured in place by means of a nut 46, the propeller shaft 47 being connected to the universal joint 46′. The propeller or drive shaft 47 is connected to a gear set or transmission mechanism (not shown) which in turn is operatively associated with an engine or other suitable prime mover. The other end of the shaft 44 is formed with a driving pinion 50 in mesh with a driven or ring gear 51. The gear 51 is bolted to a differential casing or spider 52, the latter containing differential mechanism arranged between the extremities of driven shafts 53 and 54. The differential mechanism illustrated is inclusive of bevel gears 55 and 56 meshing with pinions 57 journaled upon shaft 58 mounted in the spider 52. The housing 25 is integrally formed with aligned laterally extending portions 61 which are of partial spherical configuration, each portion terminating in a vertically disposed annular flange 62. Projecting into the spherically shaped interior portions 61 of the housing are the partial spherically shaped members 64, the latter being formed with cylindrical sleeve-like extensions 65 within which project the axles or housings 66. The axles 66 are welded as at 67 or otherwise connected to the extensions or projections 65. It should be noted that the interior partial spherical curvature of each of the portions 61 coincides with the exterior spherically shaped surface of member 64 forming a ball-like joint. An annularly shaped retaining member or ring 68 is secured to each of the flanges 62 by means of bolts 69. Each member 68 is formed with a partial spherically shaped interior surface 70 which snugly fits the spherical configuration of member 64. Member 68 is formed with a groove or recess accommodating a felt ring 71 or other suitable sealing means to shield the juxtaposed spherical surfaces from the ingress of dirt, water or other foreign matter and to prevent the loss of lubricant from the joint. It should be noted that by this arrangement the axles or axle tubes 66 are connected to the differential housing 25 so that each is capable of limited universal movement about the center of the spherical configuration of portion 61.

Positioned within each of the axle tubes 66 are live axles or shafts 74 and 75, the inner extremities of each of the shafts 74 and 75 being revolubly mounted in anti-friction bearings 73. The inner end of each of the axles 74 and 75 is splined to receive a member 76 forming an element of a universal joint mechanism 72, another member 77 of the universal joint being integrally formed on the outer extremity of each of the stub shafts 53. The center of oscillation of the universal joint mechanism for each axle shaft is coincident with the center of curvature of the partial spherical surfaces in portions 61 of housing 25 so that the universal joints 72 will permit the proper operation of the shafts 74 and 75 at all times during the oscillatory movements of the axles or axle tubes 66.

Figure 3:
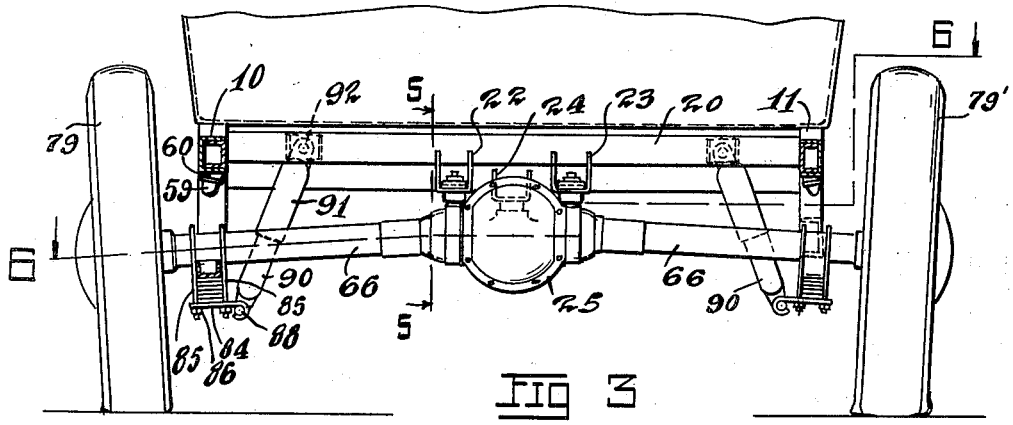
Figure 3 is a rear elevational view of the frame, spring suspension and axle of my invention.
Figure 4:
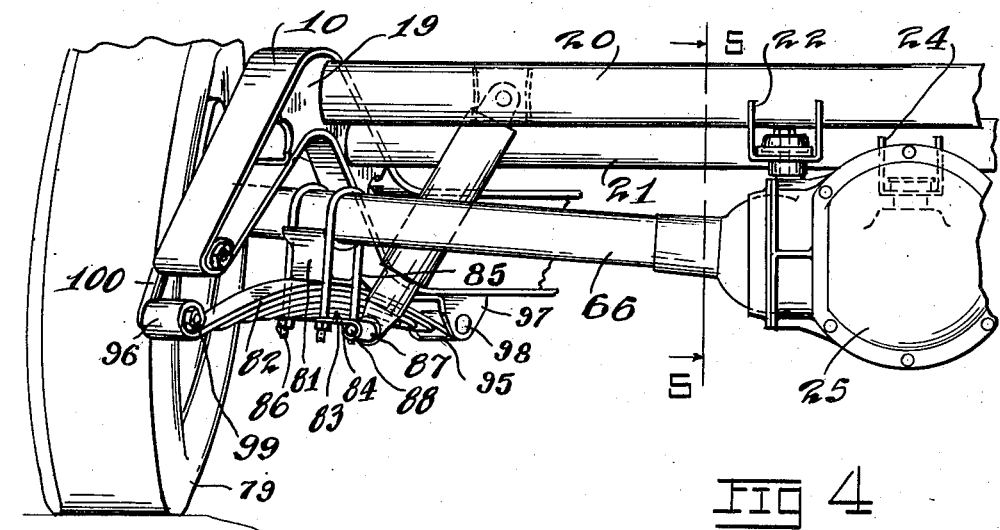
Figure 4 is a rear elevational view of a portion of a vehicle embodying my invention illustrating one position of spring suspension and axle assembly when the vehicle wheel encounters a road irregularity.
Figure 5:
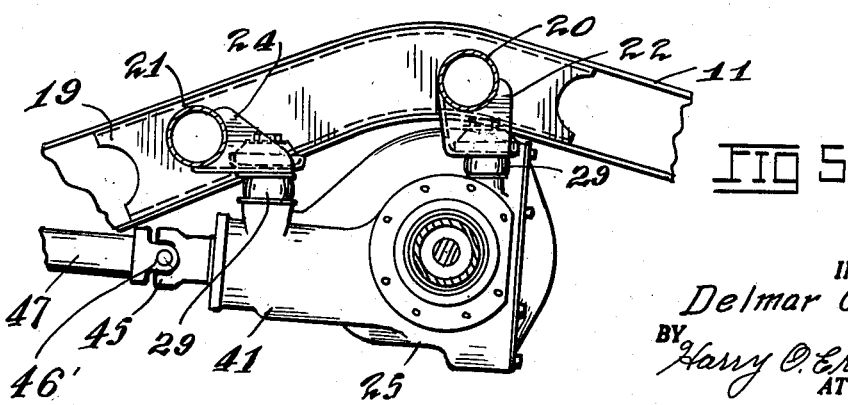
Figure 5 is a sectional view taken substantially on the line 5—5 of Figure 3.

As shown in Figure 6, shaft 74 is formed with a tapered portion to which is secured a vehicle wheel 78 provided with a pneumatic tire 79 as shown in Figures 3 and 4. The extremity of axle 66 is formed with an enlarged portion within which is mounted an anti-friction bearing 80 preferably of the roller type revolubly supporting the shaft 74 and wheel 78. Shaft 75 is connected to a vehicle wheel 78′ provided with a pneumatic tire 79′ and mounted upon shaft 75, the latter being carried in an anti-friction bearing (not shown) mounted in the extremity of the other axle 66 in the same manner as above described.

A buffer or axle movement limiting means 59 preferably of rubber or other resilient material is suitably carried in a bracket 60, one being secured to each of the frame side rails 10 and 11. Thus, when the road wheels encounter large obstructions, the upward movement of the axle is limited through its contact with the buffer 59. Each of the vehicle wheels is provided with a brake drum 40 within which is positioned brake shoes 48 carried by a disc 49 bolted to the flanged extremity of the axle 66. The brake shoes 48 are actuated into engagement with the brake drum 40 by conventional hydraulic means (not shown).

The arrangement of spring suspension and the relation thereof to the swinging axles form an important part of the present invention. As the spring construction and assembly is identical for each swinging axle for each side of the vehicle, it will suffice to herein describe one of the constructions. Each of the axles or axle tubes 66 is provided with a pad or perch 81 which is welded or otherwise rigidly secured to the axle tube. The pad 81 contacts the upper leaf 82 of a leaf spring assembly 83 comprising a series of spring leaves of different lengths. Positioned beneath the spring assembly 83 is a substantially rectangular plate 84 having openings therein to receive the leg portions of a pair of U-shaped bolts 85, the latter arranged to straddle the axle 66. The spring assembly and plate 84 are securely held in assembled relationship with the upper leaf 82 in engagement with the spring perch 81 by means of nuts 86 threaded upon the leg portions of the U-shaped clamping bolts 85. The rectangular plate 84 is formed with a projecting portion 87 which is configured to receive and form a support for a pin or shaft 88, the latter being welded to the projection formed on plate 84. Pivotally journalled upon the pin 88 is an element 90 forming an element of a hydraulic shock absorber construction of conventional design, element 90 being telescopically associated with another element 91 of the shock absorber, the latter being pivotally journalled upon a pin 92 which projects into openings formed in the tube 20 and welded thereto. A reinforcing bracket 93 is also welded to tube 20 and to pin 92 as particularly shown in Figure 1 so as to provide a sturdy and rigid anchor for the shock absorber.

The upper leaf 82 of each spring assembly 83 is configured or rolled at each end to form eyes 95 and 96. Secured to the lower flange of each frame rail is a bracket 97 having openings arranged to accommodate pins 98 passing through the eye 95 formed upon the forward end of the leaf 82 of each spring assembly. Each eye 96 formed at the rear extremity of leaf 82 is adapted to receive a transversely extending portion 99 of a spring shackle or connection 100 being pivotally carried at the rear extremity of each of the frame side rails 10 and 11. In the arrangement of my invention, the swinging axles 66 oscillating about the centers of curvature of the spherical portions 61 of the housing 25, move in substantially a transverse vertical plane through the vehicle. During this oscillation, as will be apparent from Figures 4 and 8, the leaf spring assemblies are subjected to two distinct stresses or force vectors, viz., a deflection of the spring leaves in a substantially vertical plane, and, second, a torsion or a twisting of the leaves of the spring assembly about the longitudinal axis of the spring. The latter action or stress occurs by reason of the central portions of the springs being rigidly connected to the swinging axle tube, this spring distortion during movements of the axle being illustrated in Figures 4 and 8. It is to be noted that the eyes at the extremities of the main leaves 82 of each spring assembly are held in substantially parallel relationship with respect to the frame of the vehicle by means of the pins 98 and the horizontal portion 99 of the spring shackle 100 preventing relative displacement of the spring leaf 82 at its extremities. Hence, when the swinging axle is oscillated upwardly by reason of the vehicle wheel encountering a road obstruction as exemplified in Figures 4 and 8, the leaves of the springs are not only cambered or deflected in a vertical direction but the several leaves are also twisted or distorted about a longitudinal axis.

This compound spring action provides a very important advantage in improving the ride of the vehicle. In the heretofore conventional construction and mounting of leaf spring assemblies with so called "solid" axle, which are subjected during vertical movements of an axle to deflection in a single vertical plane, such springs continue to vibrate and are brought to rest after a period of time by such factors as friction between the successive leaves, inherent molecular resistance to distortion and through the use of rebound or shock absorbing devices. Thus a leaf spring assembly subjected only to deflection in one plane has a natural period of vibration, the succeeding oscillations or vibrations continuing with decreasing amplitude until the spring comes to "rest." These successive vibrations of a leaf spring assembly are transmitted to and react upon the vehicle frame and body, and hence contribute to the discomfort of the occupants of the vehicle. In the arrangement of the present invention, however, the spring assembly is simultaneously subjected to both vertical deflection and longitudinal twist or torsion, so that the spring assembly has no natural period of vibration or uniform spring rate, but provides an arrangement having a variable spring rate.

Figure 9:
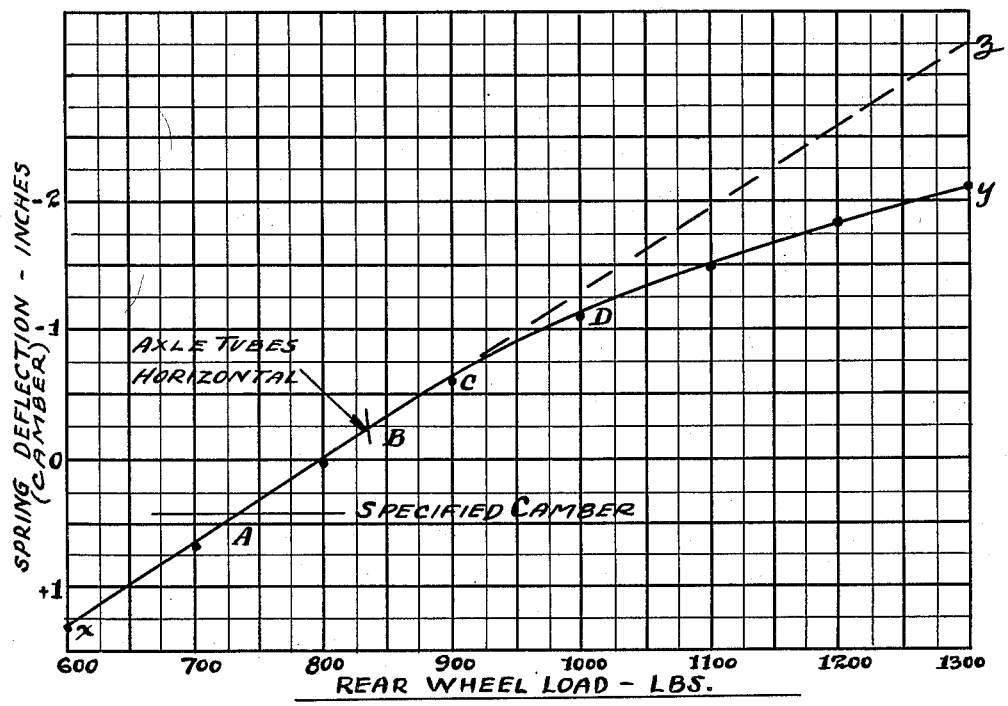
Figure 9 is a graphic representation illustrating the variable spring rate of the spring suspension forming part of my invention.
Figure 10:
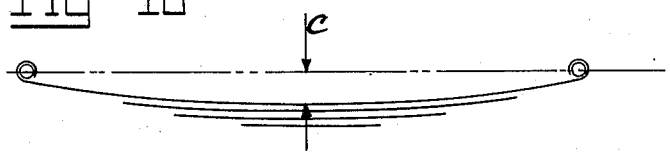
Figure 10 is a diagrammatic illustration of spring camber.

Figure 9 graphically illustrates the relationship between increments in load and corresponding spring deflection or camber (illustrated at C in Figure 10) showing the variable spring rate of the spring arrangement of my invention. This chart portrays the actual results of variable spring rate plotted from actual tests of a vehicle embodying a form of my invention. The horizontal lines represent the camber or spring deflection, while the vertical lines indicate increments in load. Thus the line XY indicates the resultant or function of spring rate in relation to the load upon the vehicle wheel with a spring assembly and swinging axle construction of my invention. It is to be noted that the specified camber, indicated at point A of the spring is the normal position of the spring under weight of the unloaded vehicle, the spring in this position not being subjected to any appreciable torsional stresses. When the load is increased, and torsional as well as vertical deflection stresses are set up, the resultant is a curved line, the camber C of the spring proportionately decreasing in amplitude as the load is increased. This chart clearly demonstrates the variable rate of the spring as it is subjected to compound stresses of vertical deflection and simultaneous longitudinal torsion. The line XY illustrates a spring of constant rate or deflection wherein the camber or deflection is equal per unit increment in load.

As indicated upon the chart, the spring has a specified camber as indicated at A, viz., plus $\tfrac{7}{16}$ of an inch when the static load on the rear wheel is 735 lbs., the normal position of the spring in static condition subjected only to the vehicle weight per se. In the particular vehicle tested the point B indicates the spring camber to be minus ¼ of an inch when the axle tubes are in horizontal position and under a load of 835 lbs. For a 900 lb. wheel load (the approximate weight on the wheel when the car has four passengers) the spring camber is minus ⅝ of an inch as indicated at C. When the vehicle wheel is loaded to 1000 lbs. the spring camber or deflection is indicated at D having a value of minus $1\tfrac{5}{32}$ inches. While the static load of the vehicle may not exceed 1000 lbs. on a wheel, or a normal spring camber under the static load above the point D, the balance of the curve from D to Y indicates the variable spring rate which obtains under the action or impact of road irregularities upon the axle construction causing the springs to be deflected or cambered in excess of the static load. Thus this variable rate of spring camber nullifies the natural period of vibration of the spring. I have found that this compound spring action, viz., deflection and torsional stresses, performs the function of quickly damping out the rebound actions of the spring, and causes the latter to be brought to "rest" very quickly, eliminating to a great extent successive spring oscillations, and provide an improved "ride" for a vehicle.

It should be noted that in the arrangement of my invention, the torque reaction is transmitted from the differential housing 25 to the frame through the resilient supports carrying the housing, while the braking reaction is transmitted to the frame through the spring assemblies 83.

Figures 3 and 4 show that during vertical oscillations of the swinging axles 66, the tread width of the tires 79 and 79' engaging the roadway will be variable as the wheels and tires have some lateral movement. This has been found to result in a distinct advantage in that the wear of the tire tread is more uniformly distributed over the tread surface instead of all of the wear occurring in a line centrally of the tread. I have also found that very little lateral scuffing or "scrubbing" of the tires contacting the roadway is encountered and I attribute this to the fact that during relative vertical movements of the wheel, the same are in rolling engagement with the roadway. While the locus of contact of the tire with the roadway may not be in parallelism with the direction of movement of the vehicle, the tire is rolling on the roadway and is not subjected to any appreciable lateral scuffing. The result of more uniformly distributing the wear over a greater tread area, is to obtain a longer useful tire life.

It is apparent that, within the scope of the invention, modifications and different arrangements may be made other than is herein disclosed, and the present disclosure is illustrative merely, the invention comprehending all variations thereof.

What I claim is:

1. In an automotive vehicle, a frame including a pair of side rails; a pair of spaced transversely extending members connecting said side rails; a differential housing; means for supporting said differential housing from the rearmost of said members at two transversely spaced points; a single connection between the forward portion of said differential housing and the other of said members; a pair of axles; a ball joint connecting each of said axles to said differential housing; each of said points of connection between the rearmost member and the housing being arranged adjacent one of said ball joints; a pair of leaf spring assemblies; each of said spring assemblies having its ends pivotally connected to the frame side rails; means for rigidly securing an intermediate portion of each spring assembly to one of the axles; a driving shaft contained within each of said axles; a vehicle wheel secured upon the extremity of each driving shaft; driving gear disposed in said differential housing and operatively connected to said driving shafts; said leaf spring assemblies and axles being so arranged that vertical movement of a vehicle wheel causes vertical deflection and longitudinal torsion of the spring assembly whereby equal increments of load result in unequal vertical movement of the axle at its point of connection with the spring assembly, and a shock absorber connecting each spring assembly with one of said transversely extending frame members.

2. In an automotive vehicle, a frame including a pair of side rails; a pair of spaced transversely extending tubular members connecting said side rails; a differential housing; a pair of axles; a ball joint connecting each of said axles to said differential housing; one of said tubular members being disposed above said differential housing and in a transverse vertical plane passing through the ball joints connecting said axles to said housing; said housing being connected at spaced points to the tubular member disposed in vertical transverse alignment with the ball joints; each of said housing supporting connections being disposed adjacent one of said ball joints; said housing having a forwardly extending portion; a single connection between the forwardly extending portion and the other of said tubular members; a pair of leaf springs; each of said springs having its ends pivotally connected to the frame side rails; means for rigidly securing an intermediate portion of each leaf spring to an axle; a driving shaft contained within each of said axles; a vehicle wheel secured upon the extremity of each driving shaft; driving gear contained in said differential housing and operatively connected to said driving shafts; each spring and axle being so arranged that vertical movements of a vehicle wheel causes vertical deflection and longitudinal torsion of the springs whereby equal increments of load result in unequal vertical movement of the axle at its point of connection with the spring.

3. In an automotive vehicle, a frame including a pair of side rails; a pair of spaced transversely extending tubular members connecting said side rails; a differential housing; a pair of axles; a ball joint connecting each of said axles to said differential housing; one of said tubular members being disposed above said differential housing and in a transverse vertical plane passing through the ball joints connecting said axles to said housing; said housing being connected at spaced points to the tubular member disposed in vertical transverse alignment with the ball joints; each of said housing supporting connections being disposed adjacent one of said ball joints; each of said connections including a bracket secured to said tubular member; resilient means associated with each bracket; means secured to said housing and engageable with said resilient means for connecting the housing to said tubular member; said housing having a forwardly extending portion; a single resilient connection between the forwardly extending portion and the other of said tubular members; a pair of leaf springs; each of said springs having its ends pivotally connected to the frame side rails; means for rigidly securing an intermediate portion of each leaf spring to an axle; a driving shaft contained within each of said axles; a vehicle wheel secured upon the extremity of each driving shaft; driving gear contained in said differential housing and operatively connected to said driving shafts; each spring and axle being so arranged that vertical movements of a vehicle wheel causes vertical deflection and longitudinal torsion of the springs whereby equal increments of load result in unequal vertical movement of the axle at its point of connection with the spring.

4. In an automotive vehicle, a frame including a pair of side rails; a pair of spaced transversely extending members connecting said side rails, the rearmost of said members being of tubular configuration; a differential housing; a pair of axles; a ball joint connecting each of said axles to said differential housing; said housing being connected at spaced points to the tubular member, each of said housing supporting connections being disposed adjacent one of said ball joints; said housing having a forwardly extending portion; a single connection between the forwardly extending portion and the other of said transversely extending members; a pair of leaf springs; each of said springs having its ends pivotally connected to the frame side rails; means for rigidly securing an intermediate portion of each leaf spring to an axle; a driving shaft contained within each of said axles; a vehicle wheel secured upon the extremity of each driving shaft; driving gear contained in said differential housing and operatively connected to said driving shafts; each spring and axle being so arranged that vertical movements of a vehicle wheel causes vertical deflection and longitudinal torsion of the spring whereby equal increments of load result in unequal vertical movement of the axle at its point of connection with the spring.

DELMAR G. ROOS.

REFERENCES CITED

The following references are of record in the file of this patent:

UNITED STATES PATENTS

| Number | Name | Date |
|---|---|---|
| 1,940,795 | Gerardi | Dec. 26, 1933 |
| 2,010,415 | Roller | Aug. 6, 1935 |
| 2,274,518 | Baker | Feb. 24, 1942 |
| 2,177,897 | Lee | Oct. 31, 1939 |
| 1,979,522 | Baker | Nov. 6, 1934 |
| 2,105,369 | Paton | Jan. 11, 1938 |
| 1,977,896 | Saurer | Oct. 23, 1934 |
| 2,246,705 | Tyler et al. | June 24, 1941 |

FOREIGN PATENTS

| Number | Country | Date |
|---|---|---|
| 848,772 | French | July 31, 1939 |